(12) United States Patent
Min et al.

(10) Patent No.: US 11,254,285 B2
(45) Date of Patent: Feb. 22, 2022

(54) APPARATUS FOR PREVENTING FORCIBLE SEPARATION OF SHIFT CABLE

(71) Applicants: HYUNDAI MOTOR COMPANY, Seoul (KR); KIA MOTORS CORPORATION, Seoul (KR)

(72) Inventors: Jeong Seon Min, Hwaseong-si (KR); Chang Hyun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 412 days.

(21) Appl. No.: 16/220,214

(22) Filed: Dec. 14, 2018

(65) Prior Publication Data
US 2020/0114870 A1   Apr. 16, 2020

(30) Foreign Application Priority Data
Oct. 10, 2018 (KR) .................. 10-2018-0120685

(51) Int. Cl.
*B60R 25/00* (2013.01)

(52) U.S. Cl.
CPC .................. *B60R 25/008* (2013.01)

(58) Field of Classification Search
CPC ... B60R 25/008; B60R 25/066; B60R 25/007; B60R 25/005
USPC .......................................... 70/201–203, 238
See application file for complete search history.

(56) References Cited

U.S. PATENT DOCUMENTS

| | | | | |
|---|---|---|---|---|
| 1,359,883 A * | 11/1920 | Feller | ............... | B60R 25/007 70/193 |
| 1,362,685 A * | 12/1920 | Farah | ............... | B60R 25/066 70/251 |
| 1,378,308 A * | 5/1921 | Adams | ............... | B60R 25/066 70/254 |
| 1,389,316 A * | 8/1921 | Mueller | ............... | B60R 25/066 70/206 |
| 1,397,420 A * | 11/1921 | Gray | ............... | B60R 25/066 70/201 |
| 1,402,150 A * | 1/1922 | Di Napoli | ............... | B60R 25/066 70/203 |
| 1,641,992 A * | 9/1927 | Reason | ............... | B60R 25/007 70/247 |
| 4,077,276 A * | 3/1978 | Knox, Jr. | ............... | B60K 17/344 70/203 |
| 4,317,346 A * | 3/1982 | Gutman | ............... | B60R 25/023 70/203 |
| 4,696,173 A * | 9/1987 | Lee | ............... | B60R 25/0228 70/427 |
| 4,759,424 A * | 7/1988 | Rolleri | ............... | B60R 11/00 180/287 |

(Continued)

FOREIGN PATENT DOCUMENTS

| | | | | |
|---|---|---|---|---|
| FR | 2701440 A3 * | 8/1994 | ............ | B60R 25/066 |
| GB | 148051 A * | 7/1920 | ............ | B60R 25/066 |

(Continued)

*Primary Examiner* — Suzanne L Barrett
(74) *Attorney, Agent, or Firm* — Lempia Summerfield Katz LLC

(57) ABSTRACT

An apparatus is provided to inhibit forcible separation of a shift cable 100 coupled to a shift lever 220 by a cover member 300 combined with a shifting device 200 which includes a shift lever housing 210 and the shift lever 220, thereby preventing forcible changing of a current gear from a P-stage to a N-stage in a vehicle. Accordingly, it is possible to help prevent theft of the vehicle.

9 Claims, 6 Drawing Sheets

(56) References Cited

U.S. PATENT DOCUMENTS

| | | | | |
|---|---|---|---|---|
| 4,842,092 A * | 6/1989 | Castro | ............... | B60R 25/002 180/287 |
| 4,942,937 A * | 7/1990 | Amberger | ............... | F16H 59/10 180/271 |
| 5,211,078 A * | 5/1993 | McCarthy | ............... | B60K 20/02 180/272 |
| 5,372,023 A * | 12/1994 | Huang | ............... | B60R 25/0221 180/287 |
| 5,379,871 A * | 1/1995 | Asano | ............... | F16H 59/10 192/220.4 |
| 5,493,880 A * | 2/1996 | Jang | ............... | B60R 25/066 16/239 |
| 5,785,626 A * | 7/1998 | Osborn | ............... | F16H 59/10 192/44 |
| 5,791,175 A * | 8/1998 | Van Wyk | ............... | B60R 25/066 70/247 |
| 6,000,256 A * | 12/1999 | Pornaghdi | ............... | B60R 25/066 70/202 |
| 6,189,398 B1 * | 2/2001 | Kataumi | ............... | F16H 59/10 74/423 |
| 11,105,420 B2 * | 8/2021 | Jeong | ............... | F16H 61/36 |
| 2003/0074999 A1 * | 4/2003 | Shioji | ............... | F16H 59/10 74/473.21 |
| 2006/0236804 A1 * | 10/2006 | Ruhlander | ............... | F16C 1/105 74/502.2 |
| 2008/0101886 A1 * | 5/2008 | Peltier | ............... | F16B 31/021 411/5 |
| 2009/0019902 A1 * | 1/2009 | Baranek | ............... | E05B 17/2092 70/237 |
| 2019/0316676 A1 * | 10/2019 | Jeong | ............... | B60R 25/066 |
| 2020/0114870 A1 * | 4/2020 | Min | ............... | B60R 25/066 |
| 2020/0309251 A1 * | 10/2020 | Min | ............... | F16H 61/22 |

FOREIGN PATENT DOCUMENTS

| | | | | |
|---|---|---|---|---|
| GB | 2362933 | * | 12/2001 | |
| KR | 10-0734943 B1 | | 6/2007 | |
| KR | 2019054443 A | * | 5/2019 | ......... B60R 25/066 |

* cited by examiner

APPARATUS FOR PREVENTING FORCIBLE SEPARATION OF SHIFT CABLE

CROSS REFERENCE TO RELATED APPLICATION

This application claims priority to and the benefit of Korean Patent Application No. 10-2018-0120685, filed Oct. 10, 2018, the entire contents of which are incorporated herein by reference.

FIELD

The present disclosure relates to an apparatus for preventing forcible separation of a shift cable.

BACKGROUND

The statements in this section merely provide background information related to the present disclosure and may not constitute prior art.

As expensive vehicles are becoming more popular, theft of vehicles frequently occurs, and some countries have made rules requiring mounting of antitheft devices.

For example, as an automotive antitheft device, there is an Electronic Steering Column Lock (ESCL), which makes steering impossible by locking a steering shaft when the engine of a vehicle is stopped.

However, the ESCL is complicated in structure because of the characteristic in which a steering system has a rotational structure, and because it is supposed to operate when an engine is stopped, an additional device related thereto must also be provided. Accordingly, the ESCL is disadvantageous in terms of manufacturing cost and weight.

The description provided above as a related art of the present disclosure is just for helping understanding the background of the present disclosure and should not be construed as being included in the related art known by those skilled in the art.

SUMMARY

The present disclosure addresses the above-mentioned problems in the prior art, and an aspect of the present disclosure provides an apparatus for preventing forcible separation of a shift cable, the apparatus having a simple structure, being simply applied, being advantageous in terms of manufacturing cost and weight, and being able to be applied to all kinds of vehicles even including inexpensive vehicles, because it has a configuration capable of preventing theft of a vehicle by preventing forcible separation of a shift cable connected to a shift lever by applying a cover member to a shift lever housing.

In accordance with an aspect of the present disclosure, an apparatus for preventing forcible separation of a shift cable may include: a cover member combined with a shifting device to cover an end of a shift cable which is connected to the shifting device; and a fastener fixing the cover member to the shifting device.

The shifting device includes: a shift lever housing fixed at a side of a driver's seat; and a shift lever rotatably coupled to the shift lever housing, and the shift cable connects the shift lever and a transmission of a vehicle to each other.

The end of the shift cable is coupled to the shift lever, a cable socket is disposed at a predetermined distance from the end, and the cable socket is fixed to the shift lever housing.

The cover member is combined with the shift lever housing to cover both the end of the shift cable and the cable socket.

The cover member is made of steel to inhibit damage and breakage due to external force.

The cover member is vertically combined with the shift lever housing, and a guide protrusion and a guide hole are formed at the shift lever housing and the cover member, respectively, along an assembly direction.

A space allowing the shift cable to be moved when the shift lever is operated is defined between the shirt lever housing and the cover member so as to prevent interference between the shift cable and the cover member, when the cover member and the shift lever housing are combined.

A vertical height between the end of the shift cable and the cable socket is within a vertical height of the cover member when the cover member is combined with the shift lever housing.

The cover member includes: a top cover extending in a front-rear direction along the top of the shift lever housing; and two side covers bending from the top cover, and the top cover is fitted to the shift lever housing, and the two side covers are fixed to the shift lever housing by the fastener.

A guide protrusion that protrudes upward is formed on the top of the shift lever housing, a guide hole is vertically formed through the top cover, and the cover member and the shift lever housing are vertically combined by the guide protrusion and the guide hole.

The two side covers respectively cover a portion of the shift cable between the end of the shift cable and the cable socket so as to prevent or inhibit a tool, which is inserted from sides of the cover member, from coming in contact with the shift cable.

In one form, a vertical length of the two side covers is greater than a lateral width of the top cover at a portion where a guide protrusion formed at the shift lever housing is positioned when the cover member is combined with the shift lever housing.

The fastener is a shear bolt that is fixed to the shifting device through a side of the cover member.

The fastener is at least one or more shear bolts that are thread-fastened to the shift lever housing through one of the two side covers.

The fastener is tightened as close to the end of the shift cable as possible.

In one form, the end of the shaft cable is in a form of an eye end through which a connector pin passes so as to connect the shift cable to a shift lever of the shifting device.

According to the present disclosure, it is possible to inhibit or prevent forcible separation of the shift cable coupled to the shift lever using the cover member combined with the shifting device including the shift lever housing and the shift lever, so it is possible to prevent forcible changing of gears from a P-stage to an N-stage in a vehicle, which can be helpful in preventing theft of the vehicle.

Further, according to one form of the present disclosure, since only the cover member and the fastener that is a shear bolt are used to prevent theft of a vehicle, the structure and application are relatively simple, it is advantageous in terms of manufacturing cost and weight, and particularly, it can be applied even to inexpensive vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
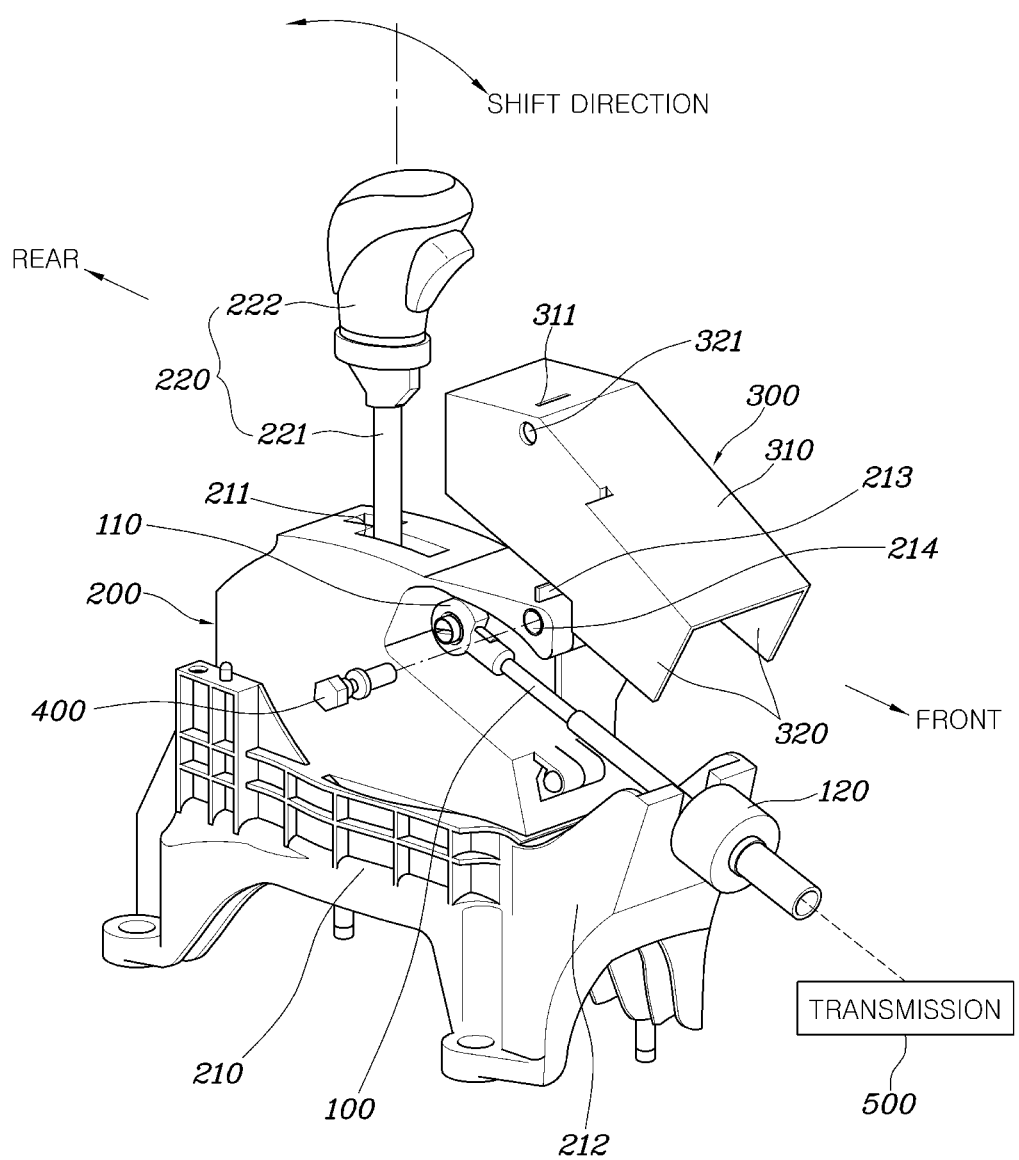
FIG. 1 is a perspective view in which a cover member and a shifting device according to an exemplary form of the present disclosure are separated from each other.
Figure 2:
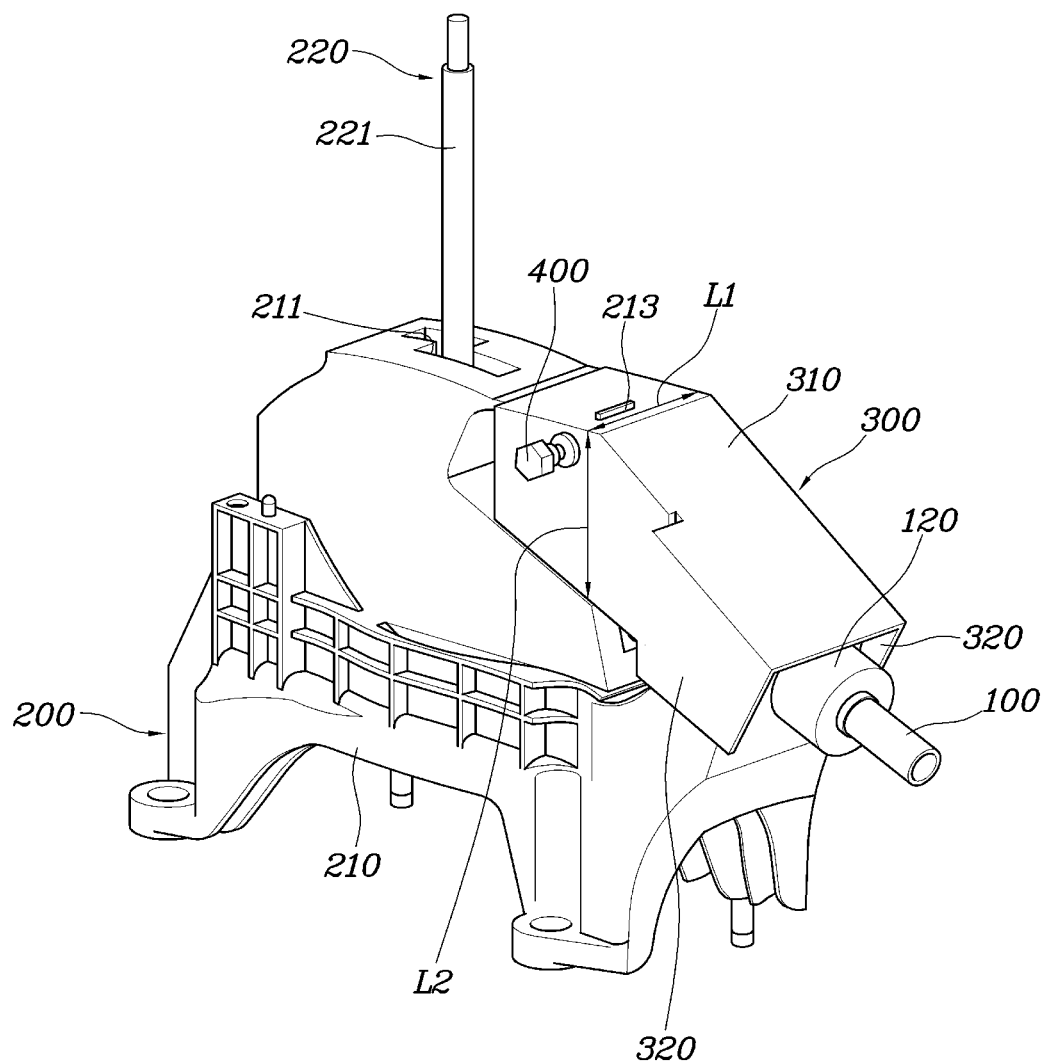
FIG. 2 is a perspective view in which the cover member and the shifting device in one form of the present disclosure are combined with each other.
Figure 3:
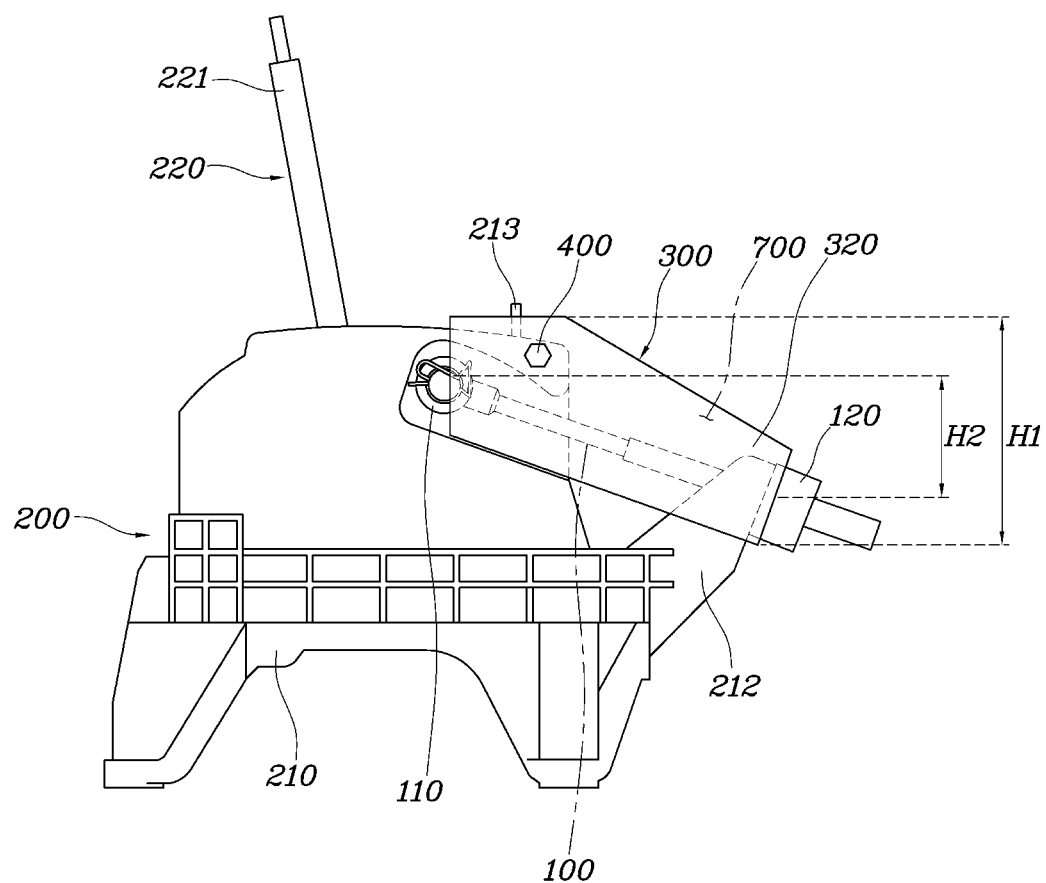
FIG. 3 is a side view of FIG. 2.
Figure 4:
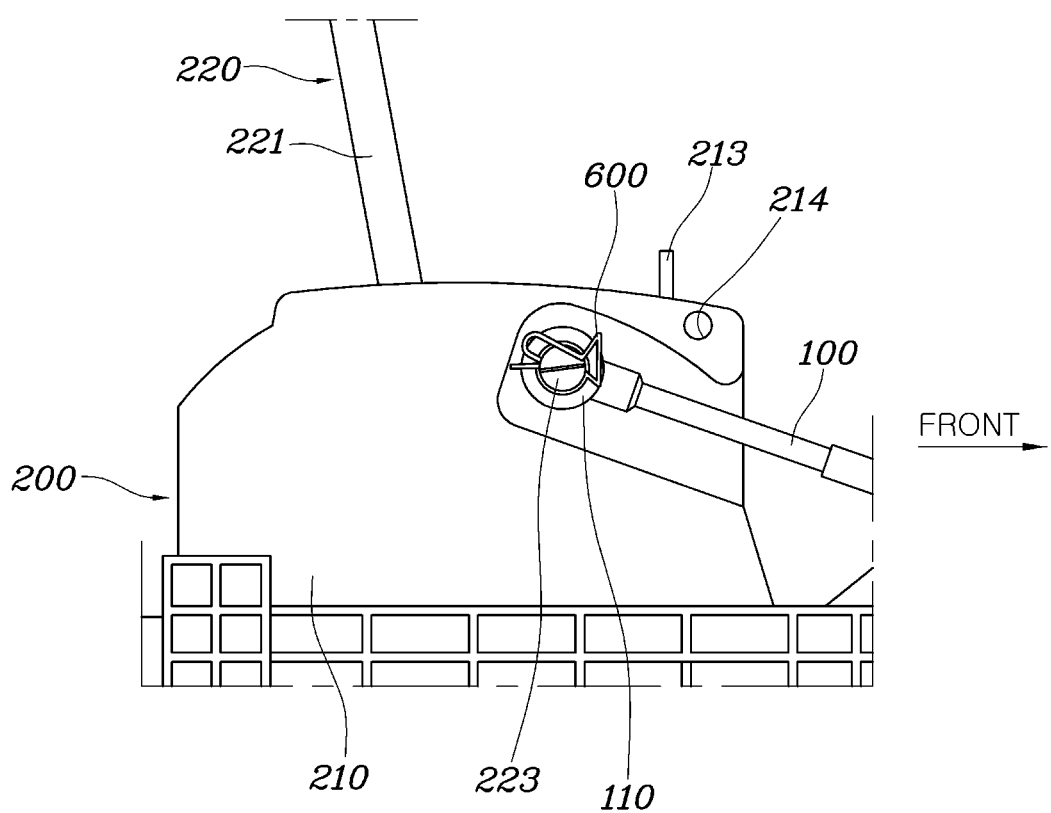
FIG. 4 is an enlarged view showing a portion to which an eye end of a shift cable is coupled.
Figure 5:
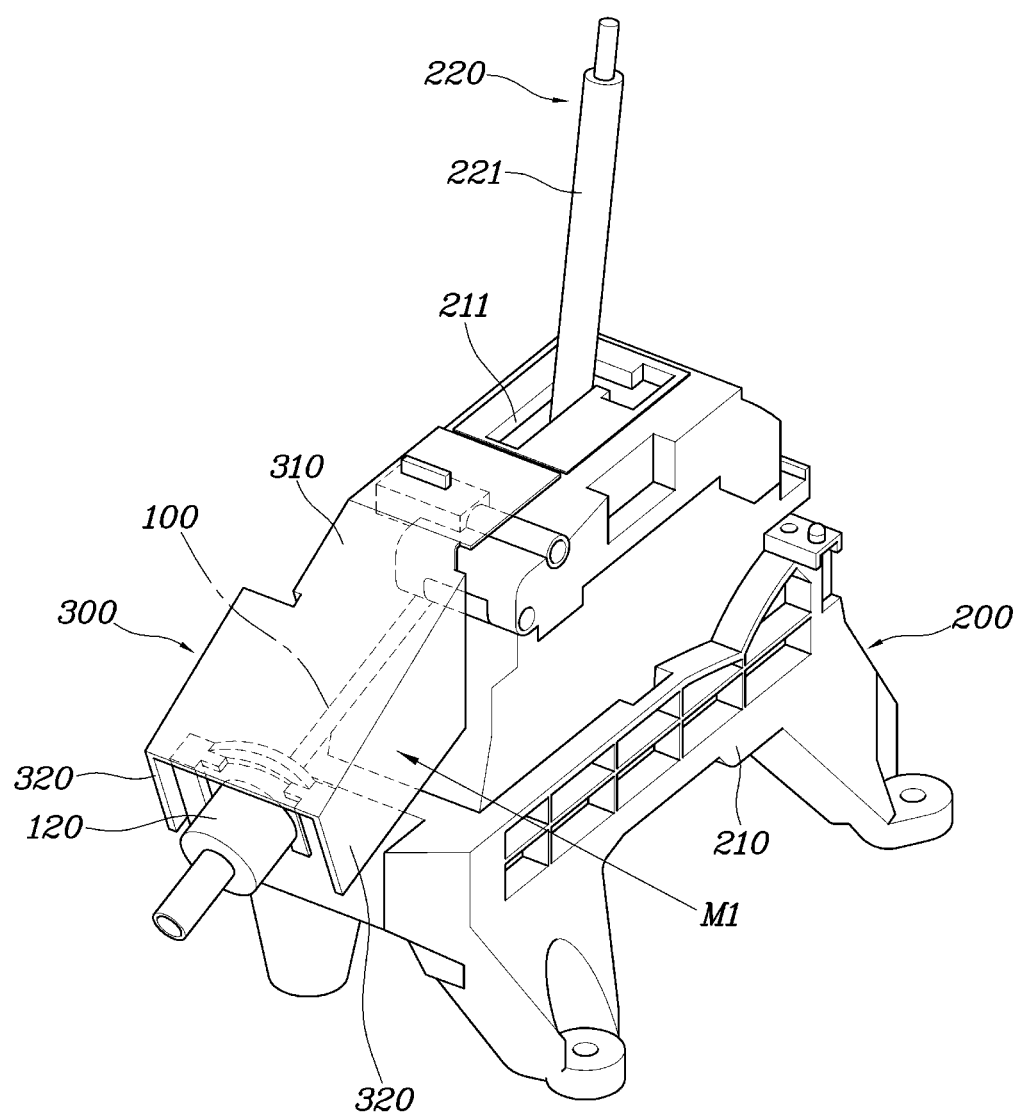
FIG. 5 is a right perspective view of FIG. 2.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An apparatus for preventing forcible separation of a shift cable according to an exemplary form of the present disclosure is described hereafter in detail with reference to the accompanying drawings.

An apparatus for preventing forcible separation of a shift cable in one form of the present disclosure, as shown in FIGS. 1 to 6, includes: a cover member 300 combined with a shifting device 200 to cover an end connected to the shifting device 200 of a shift cable 100; and a fastener 400 fixing the cover member 300 to the shifting device 200.

An exemplary form of the present disclosure relates to the shifting device 200 for an automatic transmission and the shifting device 200 is a part that a driver operates for shifting.

That is, the shifting device 200 includes a shift lever housing 210 fixed at a side of a driver's seat and a shift lever 220 rotatably coupled to the shift lever housing 210.

The shift lever 220 is defined as including a lever body rotatably coupled to the shift lever housing 210, a rod 221 coupled to the lever body, and a knob 222 coupled to an end of the rod 221.

A slot 211 enabling selection of gears (P-, R-, N-, and D-stages, etc.) is elongated in the front-rear direction at the shift lever housing 210 and the rod 221 is disposed through the slot 211.

Accordingly, when a driver holds and operates the knob 222, the rod 221 is moved in the slot 221, so the driver can select a desired gear stage.

The shift cable 100 operably connects the shift lever 220 and a transmission 500 in a vehicle to each other.

An eye end 110 formed in an end of the shift cable 100 is coupled to the shift lever 220 and a cable socket 120 is disposed at a predetermined distance from the eye end 110 and fixed to the shift lever housing 210.

In one form, the shift lever 220 has a connector pin 223 protruding to a side, the eye end 110 at the end of the shift cable 100 receives the connector pin 223 which passes through the eye end 110, and a stopper pin 600 made of steel is fitted on an end of the connector pin 223, so the eye end 110 of the shift cable 100 is combined with the shift lever 220.

The cable socket 120 is integrally formed on the shift cable 100 at a predetermined distance forward from the eye end 110. The cable socket 120 is firmly fitted on a seat 212 integrally formed at the shift lever housing 210.

The cover member 300 is coupled to the shift lever housing 210 to cover both of the eye end 110 of the shift cable 100 and the cable socket 120.

That is, it is possible to prevent theft of a vehicle by negating an attempt to separate the eye end 110 of the shift cable 100 from the connector pin 223 by external force or tools. And, it is also possible to prevent the cable socket 120 from being separated from the shift lever housing 210 with the cover member 300 combined with the shift lever housing 210. Accordingly, in one form, the cover member 300 may cover both of the eye end 110 of the shift cable 100 and the cable socket 120 when it is combined with the shift lever housing 210.

If the eye end 110 of the shift cable 100 is easily separated from the connector pin 223 or the cable socket 120 is easily separated from the seat 212 of the shift lever 210 by external force or tools, it is possible to easily change gears from the P-stage to the N-stage by operating the shift cable 100 in a vehicle, so theft of the vehicle cannot be prevented in this case.

Accordingly, in one form, the present disclosure provides a structure that covers both of the eye end 110 of the shift cable 100 and the cable socket 120 using the cover member 300 so that theft of a vehicle can be prevented.

In one form, the cover member 300 of the present disclosure is made of steel to be able to reduce or prevent damage and breakage due to external force by having sufficient rigidity and strength, but the material is not limited to steel.

In another form, the cover member 300 is coupled downward to the shift lever housing 210 for convenience of assembly and maintenance, and for this purpose, a guide protrusion 213 and a guide hole 311 are formed in the assembly direction at the shift lever housing 210 and the cover member 300, respectively.

The guide protrusion 213 integrally protrudes from the top of the shift lever housing 210. Alternatively, a separate bracket may be coupled to the top of the shift lever housing 210 and a guide protrusion may be formed on the separate bracket. In one form of the present disclosure, the guide protrusion 213 integrally protrudes from the top of the shift lever housing 210.

When the cover member 300 is combined with the shift lever housing 210, a space 700 having a predetermined size is defined between the shift lever housing 210 and the cover member 300 and the portion of the shift cable 100 between the eye end 110 and the cable socket 120 is positioned in the space 700.

When the shift lever 220 is moved in a shift direction, the shift lever 220 is rotated on a hinge shaft at the lower end thereof forward or backward with respect to the shift lever housing 210 and the eye end 110 of the shift cable 100 connected to the shift lever 220 is moved forward or backward along the rotational radius of the shift lever 220 and is also moved up or down.

Accordingly, by configuring the apparatus such that the space 700 having a predetermined size is defined between the shift lever housing 210 and the cover member 300 and the portion of the shift cable 100 between the eye end 110 and the cable socket 120 is positioned in the space 700 when the cover member 300 is combined with the shift lever housing 210, when the shift lever 220 is operated in a shift direction, the shift cable 100 can freely move without interference with the cover member 300, so frictional interference of the shift cable 100 can be removed. Therefore, it is possible to prevent noise and improve durability.

The vertical height H2 between the eye end 110 of the shift cable 100 and the cable socket 120 is within the vertical height H1 of the cover member 300 when the cover member 300 is combined with the shift lever housing 210, which is for covering the portion of the shift cable 100 between the eye end 110 and the cable socket 120 with the cover member 300, thereby preventing theft of a vehicle.

The cover member 300 includes a top cover 310 extending in the front-rear direction along the top of the shift lever housing 210 and two side covers 320 bending from both sides of the top cover 310 to face each other. The top cover 310 is fitted to the shift lever housing 210 and the side covers 320 are fixed to the shift lever housing 210 by a fastener 400.

That is, the guide protrusion 213 protruding upward is formed on the top of the shift lever housing 210 and the guide hole 311 is formed vertically through the top cover 310. Accordingly, the cover member 300 and the shift lever housing 210 are vertically combined with each other by the guide protrusion 213 and the guide hole 311.

The side covers 320 of the cover member 300 cover the portion of the shift cable 100 between the eye end 110 and the cable socket 120, thereby preventing tools from coming in contact with the shift cable 100 even if the tools are inserted from a side. Accordingly, the side covers 320 can be helpful in preventing theft of a vehicle (see the arrow M1 in FIG. 5).

In one form, the vertical length L2 of the side covers 320 is larger than the lateral width L1 of the top cover 310 at the portion where the guide protrusion 213 is positioned when the cover member 300 is combined with the shift lever housing 210.

That is, the side covers 320 are fixed to the shift lever housing 210 by the fastener 400 at the portion where the guide protrusion 213 is positioned. Accordingly, when the vertical length L2 of the side covers 320 is smaller than the lateral width L1 of the top cover 310 at the portion where the guide protrusion 213 is positioned, the side covers 320 can be relatively easily separated by external tools, and in this case, the cover member 300 may be easily separated, so theft of a vehicle cannot be prevented.

In another form, the vertical length L2 of the side covers 320 is larger than the lateral width L1 of the top cover 310 at a portion where the guide protrusion 213 is positioned when the cover member 300 is combined with the shift lever housing 210 in order to keep the cover member 300 firmly combined and accordingly to prevent theft of a vehicle.

In an exemplary form, the fastener 400 is a shear bolt that is fixed in the shifting device 200 through a side of the cover member 300.

The fastener 400 is a bolt that is thread-fastened, and when the fastener 400 is tightened through a side of the cover member 300, it is impossible to loosen the fastener 400 from above using a tool, which can be helpful in preventing theft of a vehicle.

Figure 6:
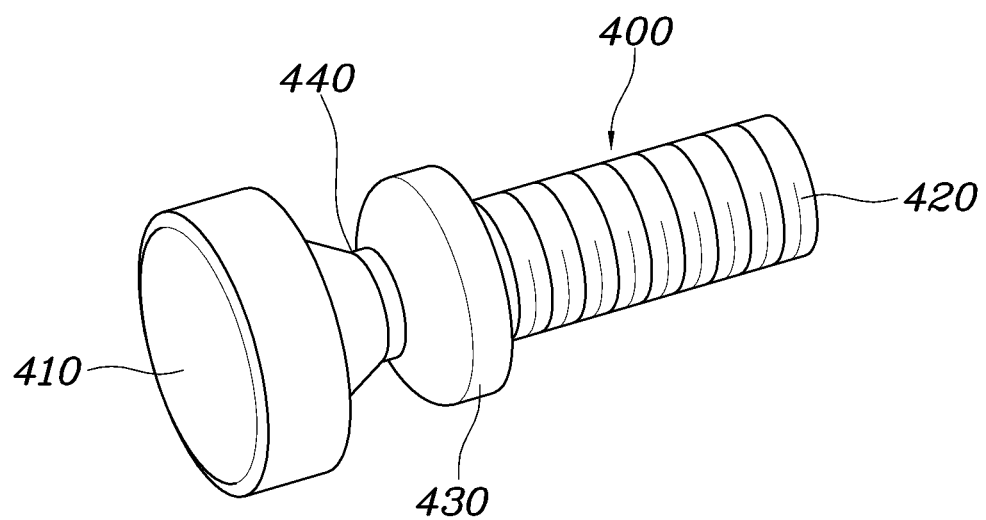
FIG. 6 is a perspective view of a shear bolt that is used as a fastener in one form of the present disclosure.

The shear bolt, as shown in FIG. 6, has a hexagonal head 410 that is operated by a tool, a threaded portion 420 for thread-fastening, a non-threaded portion 430 between the head 410 and the threaded portion 420, and a notched portion 440 recessed at the non-threaded portion 430. When predetermined level or more torque is applied after the shear bolt is tightened, it is sheared at the notched portion 440 and the head 410 is cut off, so it is impossible to loosen the shear bolt. Accordingly, in one form, a shear bolt may be used as the fastener 400 for fastening the cover member 300 in order to prevent theft of a vehicle.

The fastener 400 that is a shear bolt is tightened in the shift lever housing 210 through a side cover 320. In other form, at least one or more fasteners may be provided, but if too many fasteners are used, work is inconvenient, and thus three or four fasteners are recommended.

A through-hole 321 is formed through the side covers 320 to tighten the fastener 400 and a tap hole 214 is formed through a side of the shift lever housing 210.

It is desired to tighten the fastener 400 as close to the eye end 110 of the shift cable 100 as possible. If the fastener 400 is tightened far away from the eye end 110, the side cover 320 close to the eye end 110 can be easily moved and separated by tools. Accordingly, to prevent this case, it is desired to tighten the fastener 400 as close to the eye end 110 of the shift cable 100 as possible in order to keep the side cover 320 as firmly combined as possible.

As described above, according to one form of the present disclosure, forcible separation of the shift cable 100 coupled to the shift lever 220 is prevented by the cover member 300 combined with the shifting device 200 including the shift lever housing 210 and the shift lever 220, thereby preventing forcible changing of the current gear from the P-stage to the N-stage in a vehicle. Accordingly, it is possible to help prevent theft of the vehicle.

Further, according to an exemplary form of the present disclosure, only the cover member 300 and the fastener 400 that is a shear bolt are used to prevent theft of a vehicle, the structure and application are relatively simple, it is advantageous in terms of manufacturing cost and weight, and particularly, it can be applied to all inexpensive vehicles.

Although the present disclosure was described with reference to exemplary forms shown in the drawings, it is apparent to those skilled in the art that the present disclosure may be changed and modified in various ways without departing from the scope of the present disclosure.

What is claimed is:

1. An apparatus for preventing forcible separation of a shift cable, the apparatus comprising:
    a shifting device including:
        a shift lever housing fixed at a side of a seat for a driver of a vehicle and including a side surface formed with a recessed portion, and
        a shift lever rotatably coupled to the shift lever housing;
    a shift cable configured to connect the shift lever to a transmission of the vehicle and having an end forming an eye end connected to the shift lever, wherein the eye end of the shift cable is disposed in the recessed portion and assembled to the shift lever in a lateral direction of the shift lever housing;
    a cover member combined with the shift lever housing;
    a fastener fixing the cover member to the shift lever housing in the lateral direction; and
    a cable socket coupled to the shift cable at a predetermined distance from the eye end of the shift cable and mounted on an outer wall of the shift lever housing,
    wherein the cover member is configured to cover both the eye end of the shift cable and the cable socket, wherein the cover member includes:
a top cover extending in a front-rear direction along a top of the shift lever housing; and
two side covers bending from the top cover, wherein one side cover of the two side covers is configured to cover the recessed portion, and
wherein the top cover is fitted to the shift lever housing, and the two side covers are fixed to the shift lever housing by the fastener, and
wherein the fastener is arranged close to the eye end of the shift cable.

2. The apparatus of claim 1, wherein the cover member is made of steel to inhibit damage and breakage due to an external force.

3. The apparatus of claim 1,
wherein a guide protrusion and a guide hole are formed at the shift lever housing and the cover member, respectively, along an assembly direction.

4. The apparatus of claim 1, wherein a space configured to allow the shift cable to be moved when the shift lever is operated is defined between the shift lever housing and the cover member such that interference between the shift cable and the cover member is inhibited, when the cover member and the shift lever housing are combined.

5. The apparatus of claim 1, wherein a vertical height between the eye end of the shift cable and the cable socket is within a vertical height of the cover member when the cover member is combined with the shift lever housing.

6. The apparatus of claim 1, wherein the two side covers respectively cover a portion of the shift cable between the eye end of the shift cable and the cable socket so as to inhibit a tool, which is inserted from sides of the cover member, from coming in contact with the shift cable.

7. The apparatus of claim 1, wherein a vertical length of the two side covers is greater than a lateral width of the top cover at a portion where a guide protrusion formed at the shift lever housing is positioned when the cover member is combined with the shift lever housing.

8. The apparatus of claim 1, wherein the fastener is a shear bolt that is thread-fastened to the shift lever housing through one of the two side covers.

9. The apparatus of claim 1, further comprising: a connector pin configured to pass through the eye end of the shift cable so as to connect the shift cable to the shift lever of the shifting device.

* * * * *